US010852917B2

(12) United States Patent
Zurek et al.

(10) Patent No.: US 10,852,917 B2
(45) Date of Patent: Dec. 1, 2020

(54) METHOD AND APPARATUS FOR CONTROLLING SHARING OF SELECTED CONTENT BETWEEN A PORTABLE COMMUNICATION DEVICE AND A TARGET DEVICE

(71) Applicant: Motorola Mobility LLC, Chicago, IL (US)

(72) Inventors: Robert Zurek, Antioch, IL (US); Joel A Clark, Woodridge, IL (US); Steve Kim, Park Ridge, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 535 days.

(21) Appl. No.: 15/198,011

(22) Filed: Jun. 30, 2016

(65) Prior Publication Data

US 2018/0004372 A1 Jan. 4, 2018
US 2019/0155463 A9 May 23, 2019

Related U.S. Application Data

(60) Provisional application No. 62/186,467, filed on Jun. 30, 2015.

(51) Int. Cl.
| | |
|---|---|
| *G06F 3/0484* | (2013.01) |
| *H04W 4/02* | (2018.01) |
| *H04M 1/725* | (2006.01) |
| *G06F 3/16* | (2006.01) |
| *G06F 3/01* | (2006.01) |
| *G06F 3/14* | (2006.01) |
| *G06F 1/16* | (2006.01) |

(52) U.S. Cl.
CPC .......... *G06F 3/0484* (2013.01); *G06F 1/1694* (2013.01); *G06F 1/1698* (2013.01); *G06F 3/017* (2013.01); *G06F 3/1454* (2013.01); *G06F 3/165* (2013.01); *G06F 3/167* (2013.01); *H04M 1/7253* (2013.01); *H04W 4/023* (2013.01); *G09G 2370/022* (2013.01); *G09G 2370/04* (2013.01); *G09G 2370/042* (2013.01); *G09G 2370/16* (2013.01); *H04M 2250/12* (2013.01)

(58) Field of Classification Search
CPC .... G06F 3/0484; G06F 1/1694; G06F 1/1698; G06F 3/017; G06F 3/1454; G06F 3/165; G06F 3/167; H04M 1/7253; H04M 2250/12; H04W 4/023; G09G 2370/022; G09G 2370/04; G09G 2370/042; G09G 2370/16
See application file for complete search history.

(56) References Cited

U.S. PATENT DOCUMENTS

| | | | | |
|---|---|---|---|---|
| 7,072,939 B1 * | 7/2006 | Amro | ................... | H04L 67/2823 709/201 |
| 2010/0153577 A1 * | 6/2010 | Wohlert | ............. | H04N 7/17318 709/231 |

(Continued)

*Primary Examiner* — James T Tsai

(57) ABSTRACT

A method performed by a portable communication device includes determining a list of at least one target device in proximity to the portable communication device. The method further includes receiving a set of non-tactile user commands that indicates selected content and a selected set of target devices on the list and controlling sharing of the selected content between the portable communication device and the selected set of target devices.

15 Claims, 12 Drawing Sheets

(56) References Cited

U.S. PATENT DOCUMENTS

| | | | |
|---|---|---|---|
| 2010/0156812 A1* | 6/2010 | Stallings | G06F 3/04883 345/173 |
| 2011/0037712 A1* | 2/2011 | Kim | H04M 1/7253 345/173 |
| 2011/0289147 A1* | 11/2011 | Styles | G06F 1/1613 709/205 |
| 2011/0313768 A1* | 12/2011 | Klein | G06F 3/038 704/251 |
| 2012/0216153 A1* | 8/2012 | Sip | G06F 1/1698 715/863 |
| 2013/0031192 A1* | 1/2013 | Caspi | H04L 65/1069 709/206 |
| 2014/0006496 A1* | 1/2014 | Dearman | H04L 67/16 709/204 |
| 2014/0025847 A1* | 1/2014 | Choi | H04L 67/06 710/33 |
| 2014/0026092 A1* | 1/2014 | Oguma | G06F 3/0481 715/777 |
| 2014/0053078 A1* | 2/2014 | Kannan | H04W 4/023 715/748 |
| 2014/0150032 A1* | 5/2014 | Pacor | H04N 21/21805 725/62 |
| 2014/0188989 A1* | 7/2014 | Stekkelpak | H04L 67/02 709/204 |
| 2016/0294918 A1* | 10/2016 | Walline | H04L 67/06 |
| 2017/0268897 A1* | 9/2017 | Yuan | B60W 40/08 |

* cited by examiner

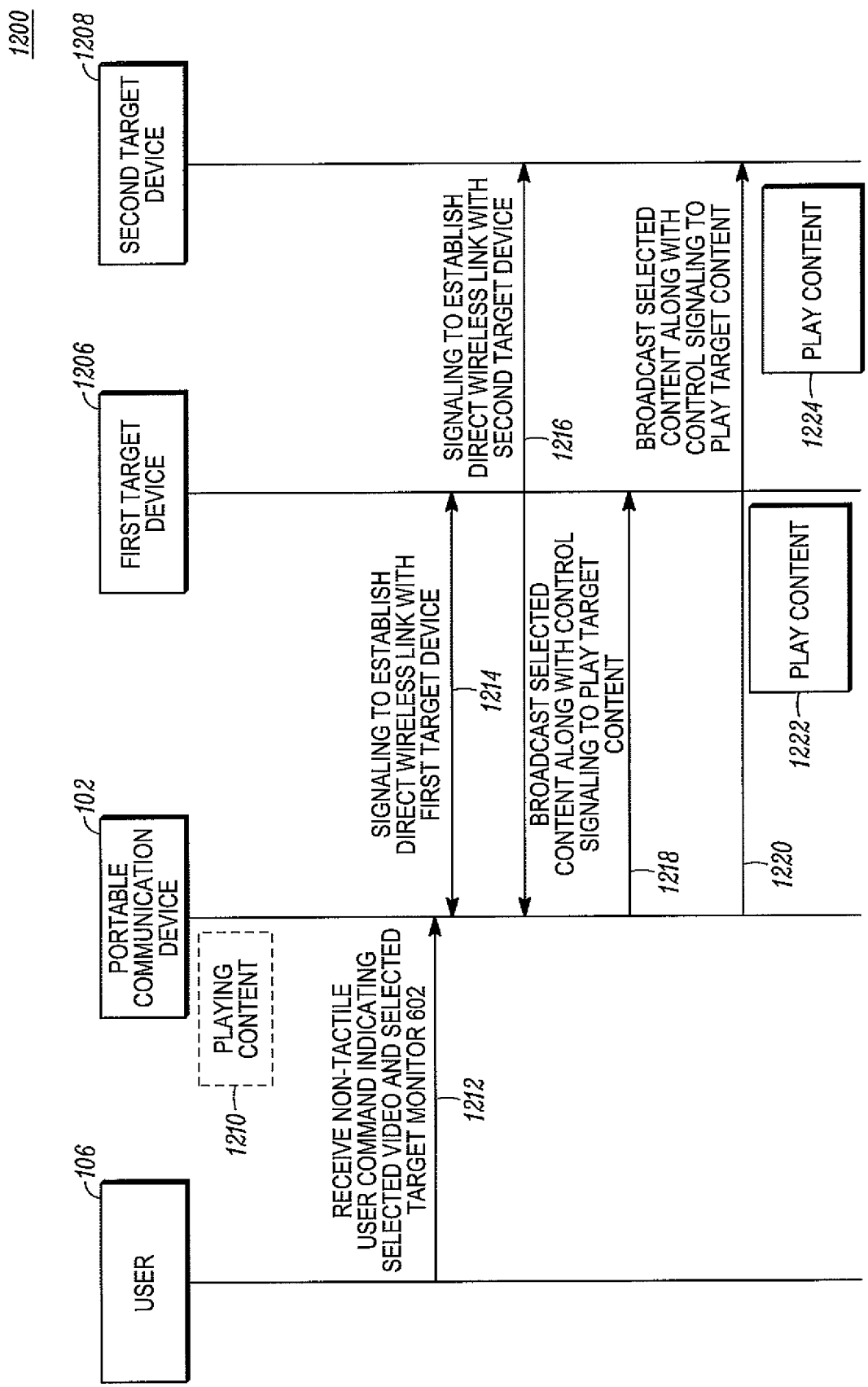

METHOD AND APPARATUS FOR CONTROLLING SHARING OF SELECTED CONTENT BETWEEN A PORTABLE COMMUNICATION DEVICE AND A TARGET DEVICE

RELATED APPLICATIONS

The present application is related to and claims benefit under 35 U.S.C. § 119(e) from U.S. Provisional Patent Application Ser. No. 62/186,467, filed Jun. 30, 2015 titled "Method and Apparatus for Controlling Playing of Selected Content between a Portable Communication Device and a Target Device", which is commonly owned with this application by Motorola Mobility LLC, the entire contents of which are incorporated herein by reference.

FIELD OF THE DISCLOSURE

The present disclosure relates to content sharing and more particularly to controlling the sharing of selected content between a portable communication device and a target device.

BACKGROUND

Portable communication devices are being increasingly used to share content such as video clips, pictures, and the like. For example, multiple users can share content over direct connections between their respective communication devices when the user providing the content and the one or more users receiving the content input coordinating tactile gestures on their devices. This mechanism enables some ease in sharing content between devices but is not useful in sharing content when, for example, one or more of the devices involved in the content sharing is not capable of receiving tactile input or is not operated by a user to facilitate the content sharing.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 12 is a message sequence diagram illustrating an embodiment for controlling the sharing and playing of selected content between a portable communication device and multiple selected target devices.

Figure 1:
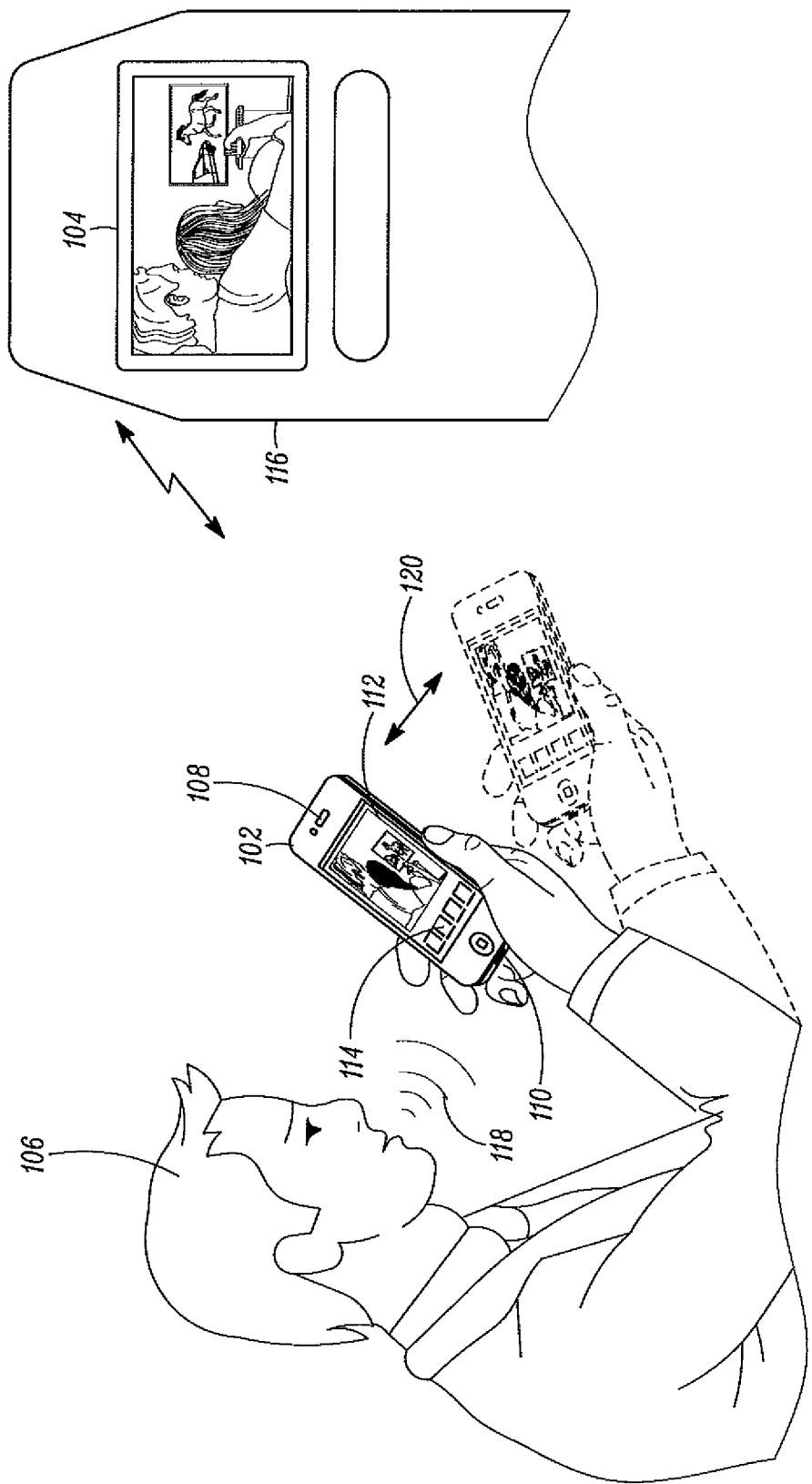
FIG. 1 is a schematic diagram illustrating an environment within which may be implemented embodiments of methods and devices for controlling sharing of selected content between a portable communication device and a selected target device.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments disclosed herein is a method performed by a portable communication device that includes determining a list of at least one target device in proximity to the portable communication device. The method further includes receiving a set of non-tactile user commands that indicates selected content and a selected set of target devices on the list and controlling sharing of the selected content between the portable communication device and the selected set of target devices. For an example, controlling the sharing of the selected content between the portable communication device and the selected set of target devices includes controlling the playing of the selected content between the portable communication device and the selected set of target devices.

In another embodiment, a portable communication device includes an input component, a voice processing module, a sensor hub, and a processor. The input component and the voice processing module are coupled together to receive an utterance and to detect a voice command from the utterance. The sensor hub is to detect a spatial gesture. The processor is coupled to the voice processing module and the sensor hub. The processor is to: determine a list of at least one target device in proximity to the portable communication device; determine, from the voice command, the spatial gesture, or both, selected content and a selected set of target devices; and control sharing of the selected content between the portable communication device and the selected set of target devices.

FIG. 1 shows a user 106 controlling a portable communication device 102 to communicate with a selected target device 104. As shown, the target device 104 is a monitor embedded in a seat 116, such as a seat in a car or on an airplane. Examples of a portable communication device, also referred to herein simply as a "portable device," include, but are not limited to, a wireless phone, a laptop, a smartphone, a personal digital assistant, a media player, or any other type of communication device capable of being transported by an individual and presenting content, such as by displaying an image and/or playing audio.

The portable device 102 includes a set of one or more speakers 108, a microphone 110, and a display 112. The speakers 108 can be used for playing audio associated with a video or music or for playing another form of audio. The user 106 can use the microphone 110 to communicate voice commands to instruct the portable device 102 to, for instance, load a video, play a video, play a song, and the like. The display 112 can receive tactile inputs from the user 106 and translate those inputs into tactile user commands, for instance. For this implementation, a portion of the display 112 includes buttons 114 for receiving tactile inputs.

Figure 2:
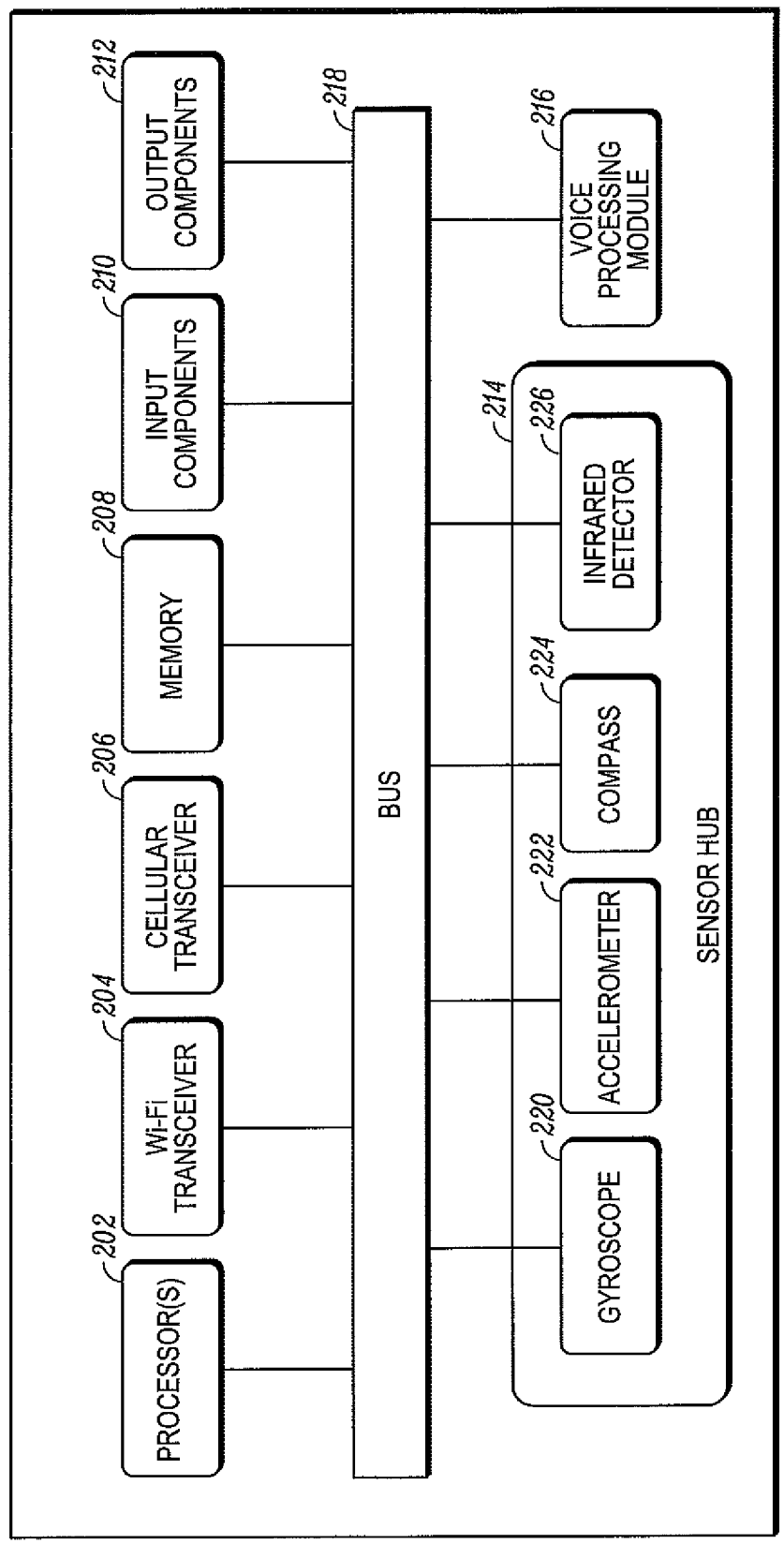
FIG. 2 illustrates a block diagram of internal hardware components of a portable communication device configured in accordance with an embodiment.

FIG. 2 shows a block diagram 200 of a portable communication device, which for some embodiments represents the portable device 102. Included within the block diagram 200 are one or more processors 202, a wireless local area network (WLAN) transceiver 204, a cellular transceiver 206, memory 208, input components 210, output components 212, a sensor hub 214, and a voice processing module 216, which are all operationally interconnected by internal connections 218 such as a bus. A limited number of device components 202, 204, 206, 208, 210, 212, 214, 216, and 218 are shown at 200 for ease of illustration. Other embodiments may include a lesser or greater number of components in a portable communication device. Moreover, other components needed for a commercial embodiment of a portable communication device that incorporates the components 202, 204, 206, 208, 210, 212, 214, 216, 218 shown in the diagram 200 are omitted from FIG. 2 for clarity in describing the enclosed embodiments.

In general, the processor 202 is configured with functionality in accordance with embodiments of the present disclosure as described herein with respect to the remaining figures. "Configured," "adapted," "operative," or "capable," as used herein, means that indicated components are implemented using one or more hardware elements, such as one or more operatively coupled processing cores, memory elements, and interfaces, which may or may not be programmed with software and/or firmware, as the means for the indicated components to implement their desired functionality. For an example, the processor 202 can be configured through executing algorithms consistent with one or more of the methods illustrated by the logical flow diagrams and message sequence diagrams shown in FIGS. 3, 5, 6, 7, 8, 9, 10, 11, and 12 and the accompanying description. Such functionality is supported by the other hardware shown in FIG. 2, including the device components 204, 206, 208, 210, 212, 214, 216 which are all operatively interconnected with the processor 202 by the bus 218.

The processor 202, for instance, includes arithmetic logic and control circuitry necessary to perform the digital processing, in whole or in part, for the portable device 102 to control the sharing, e.g., playing, of selected content between the portable device 102 and one or more selected target devices, in accordance with described embodiments for the present teachings. For one embodiment, the processor 202 represents a primary microprocessor, also referred to as a central processing unit (CPU), of the portable device 102. For example, the processor 202 can represent an application processor of a tablet. In another embodiment, the processor 202 is an ancillary processor, separate from the CPU, wherein the ancillary processor is dedicated to providing the processing capability, in whole or in part, needed for the components of the portable device 102 to perform at least some of their intended functionality.

The WLAN transceiver 204 enables the portable device 102 to access the Internet using standards such as Wi-Fi or WiGig. Moreover, the WLAN transceiver 204 enables the portable device 102 to send and receive radio signals to and from similarly equipped devices using a wireless distribution method, such as a spread-spectrum or orthogonal frequency-division multiplexing (OFDM) method. For some embodiments, the WLAN transceiver 204 uses an Institute of Electrical and Electronics Engineering (IEEE) 802.11 (e.g., a, b, g, n, ac, or ad) standard to communicate with other devices in the 2.4 GHz, 3.65 GHz, 4.9 GHz, 5 GHz, 5.9 GHz, and 60 GHz frequency bands.

The cellular transceiver 206 is configured to conduct cellular communications of data over wireless connections using any suitable wireless technology. For example, the cellular transceiver 206 enables the portable device 102 to engage in information exchange sessions, such as calls or message exchange sessions, with other portable devices using one or more cellular networks. Cellular networks can use any wireless technology that, for example, enables broadband and Internet Protocol (IP) communications including, but not limited to: 3G wireless technologies such as CDMA2000 and Universal Mobile Telecommunications System ("UMTS") networks; 4G technologies such as Long-Term Evolution (LTE) and WiMAX; or 5G technologies.

The memory 208 stores electronic data used by the processor 202 in performing its functionality. For example, the processor 202 can use the memory 208 to store or load files and applications associated with controlling the sharing of selected content between the portable device 102 and one or more selected target devices. In one embodiment, the memory 208 represents random access memory (RAM). In other embodiments, the memory 208 represents volatile or non-volatile memory. For a particular embodiment, a portion of the memory 208 is removable. For example, the processor 202 can use RAM to cache data while it uses a micro secure digital (microSD) card to store files associated with controlling the sharing of selected content between the portable device 102 and one or more selected target devices.

The input 210 and output 212 components represent user-interface components of the portable device 102 configured, for example, to allow the user 106 to use, program, or otherwise interact with the portable device 102. Different embodiments of portable devices can include different combinations of input 210 and output 212 components. For one embodiment, the input 210 and output 212 components include a touchscreen that functions as both an input component and an output component. For example, a touchscreen enables the user 106 to see, for instance on the display 112, displayed view elements, such as the buttons 114, for a mobile application and to actuate the view elements by tapping on them.

For other embodiments, the input components 210 include peripheral devices, such as keyboards, mice, and touchpads. A speaker, for instance as included in the set of speakers 108, is an example of an output component 212 that converts electrical audio signals into sound. For one example, a speaker enables the portable device 102 to verbally prompt a user for input. Particular embodiments include an acoustic transducer, such as the microphone 110, as an input component 210 that converts received sounds, such as one or more utterances 118, into electrical signals that can be stored and processed by the voice processing module 216 in order to detect voice commands.

The sensor hub 214 includes one or a combination of a gyroscope 220, an accelerometer 222, a compass 224, and an infrared detector 226. In a particular example, one or more of the gyroscope 220, the accelerometer 222, the compass 224, or the infrared detector 226 is configured to detect a spatial gesture 120 from the user 106 moving the portable device 102. These are example sensors. Accordingly, the sensor hub 214 can include one or more additional or alternative sensors, not shown, such as a camera to detect spatial gestures.

The gyroscope 220 is adapted to measure angular acceleration of the portable device 102 around three orthogonal axes, e.g., x, y, and z axes, with respect to yaw, pitch and roll. In one instance, the accelerometer 222 is configured to sense a rate of change in velocity along the x, y, and z axes. The accelerometer 222 may include a weight attached to a lever arm to record movement along the x, y, and z axes according to measureable responses of the lever arm to movement of the portable device 102. This type of accelerometer generates x, y, and z values while experiencing non-constant movement. Alternatively or additionally, the accelerometer 222 is configured to generate the x, y, and z values when experiencing constant motion. However, for simplicity, the present teachings are described predominately without regard to the use of a constant-motion detecting accelerometer.

The compass 224 is configured to determine the direction of magnetic north and bearings therefrom. For example, the compass 224 provides a general cardinal direction, e.g., north, south, east, or west, in which the portable device 102 is pointing. The infrared detector 226 is a transducer of radiant energy that converts radiant energy in the infrared spectrum into a measureable form. The infrared detector 226 reacts to infrared radiation.

The voice processing module 216 is configured to receive voice utterances or speech 118 and recognize, store, and forward voice processing samples as well as perform text to speech analysis. Portable devices that include a microphone might also include the voice processing module 216, which, in an embodiment, includes hardware and software elements needed to process voice data by recognizing words. Processing voice data includes identifying voice commands from speech 118. This type of processing is used, for example, when one wishes to give a verbal instruction or command to control the playing or display of content.

For different embodiments, the voice processing module 216 can include a single or multiple voice processing engines of varying types, each of which is best suited for a particular task or set of conditions, such as for specific characteristics of a voice or noise conditions. The voice processing module 216 might also include a voice activity detector (VAD), which allows the portable device 102 to, for instance, discriminate between those portions of a received acoustic signal that include speech and those portions that do not.

For some embodiments, for instance as described by reference to the remaining FIGS. 3 through 12, a portable device, such as the portable device 102, controls sharing, including playing, of selected content between the portable device 102 and one or more selected target devices, such as the target device 104, in proximity to, in the vicinity of, or near the portable device 102. The control mechanism, signaling, and/or commands for causing the sharing of the selected content is initiated and/or facilitated by a set of one or more non-tactile user commands, such as one or more voice commands and/or spatial gestures, detected by the portable device 102. Thus, in a sense, the portable device 102 can be said to function as a voice and/or gesture driven remote control for sharing, and in some instances playing, selected content between the portable device 102 and one or more target devices near the portable device 102.

Content is any information that can be sensed by a user. Content includes, for example, pictures, video, music or other audio, emails, voicemails, etc. A target device is any device capable of communicating with a portable device for sharing and playing selected content. Example target devices include, but are not limited to, a television, a monitor, a speaker, a stereo receiver, a multimedia receiver, a multimedia dock, a video player, a portable device, a personal computer, a laptop computer, etc.

For selected content to be shared "between" the portable device and a selected target device, the content or at least an identifier for the content is accessible to both the portable device and the selected target device. Sharing selected content between the portable and one or more selected target devices can include, for example: the portable device sending the selected content to or receiving the selected content from the target device over a direct wireless connection; the portable device downloading from a server selected content that is accessible to and/or that has been accessed by the target device or the target device downloading from the server selected content that is accessible to and/or that has been accessed by the portable device; the portable device directing the target device to access selected content that is stored locally in or stored in a cloud accessible to both the portable device and the target device, etc.

Sharing selected content between the portable device and a selected target device can further include controlling the playing of the selected content between the portable device and the selected target device. For an example, controlling the playing of the selected content between the portable device and the selected target device includes causing the visual display or audible output of the selected content from one or both of the portable and target devices. For another example, controlling the playing of the selected content between the portable devices and the selected target device includes one device directing, e.g., through protocol commands to, the other device to rewind, fast-forward, pause, etc., the content as the content is visually displayed and/or audibly output.

Figure 3:
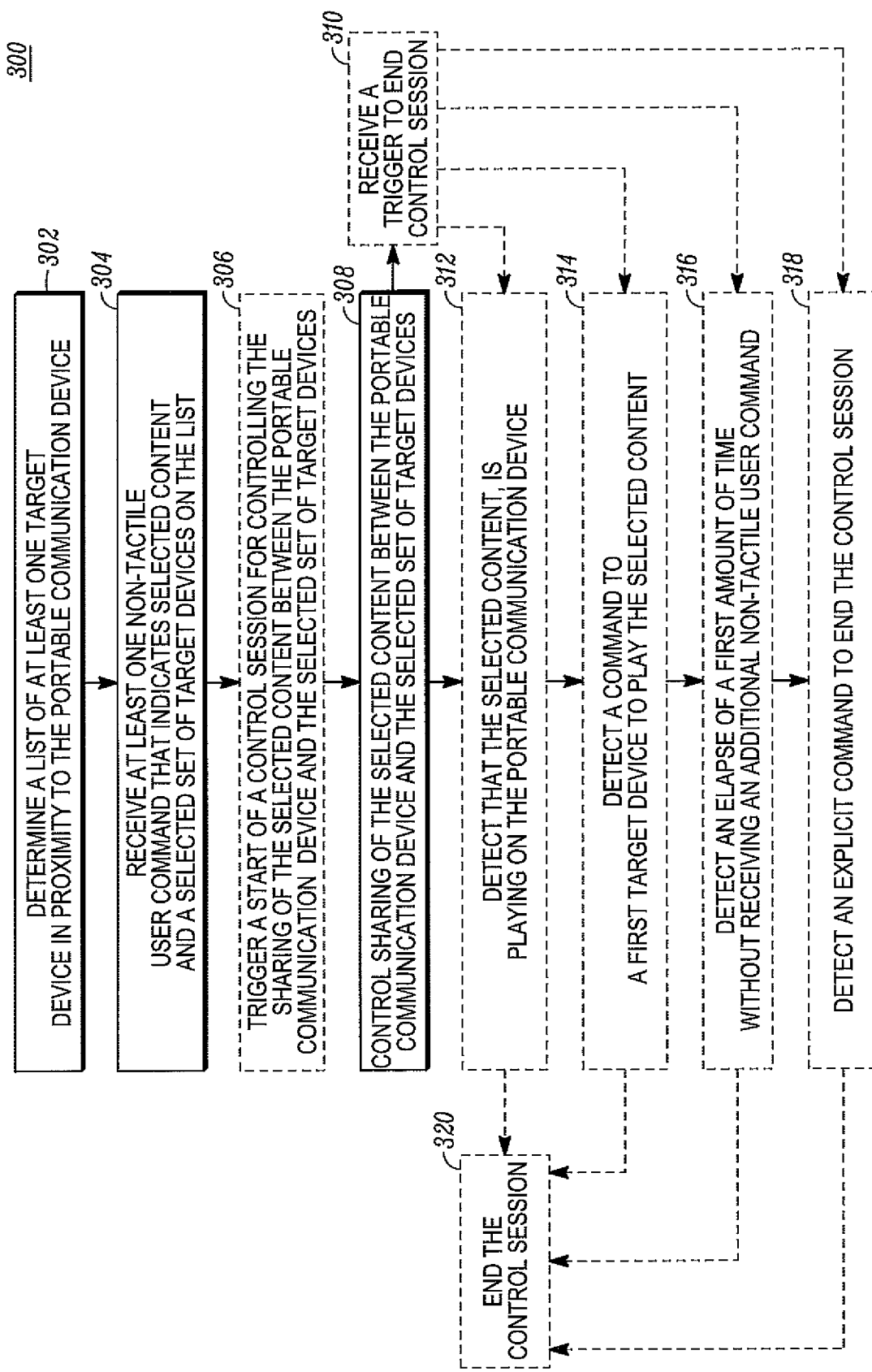
FIG. 3 is a flow diagram illustrating an embodiment of a method for controlling sharing of selected content between a portable communication device and a selected target device.
Figure 4:
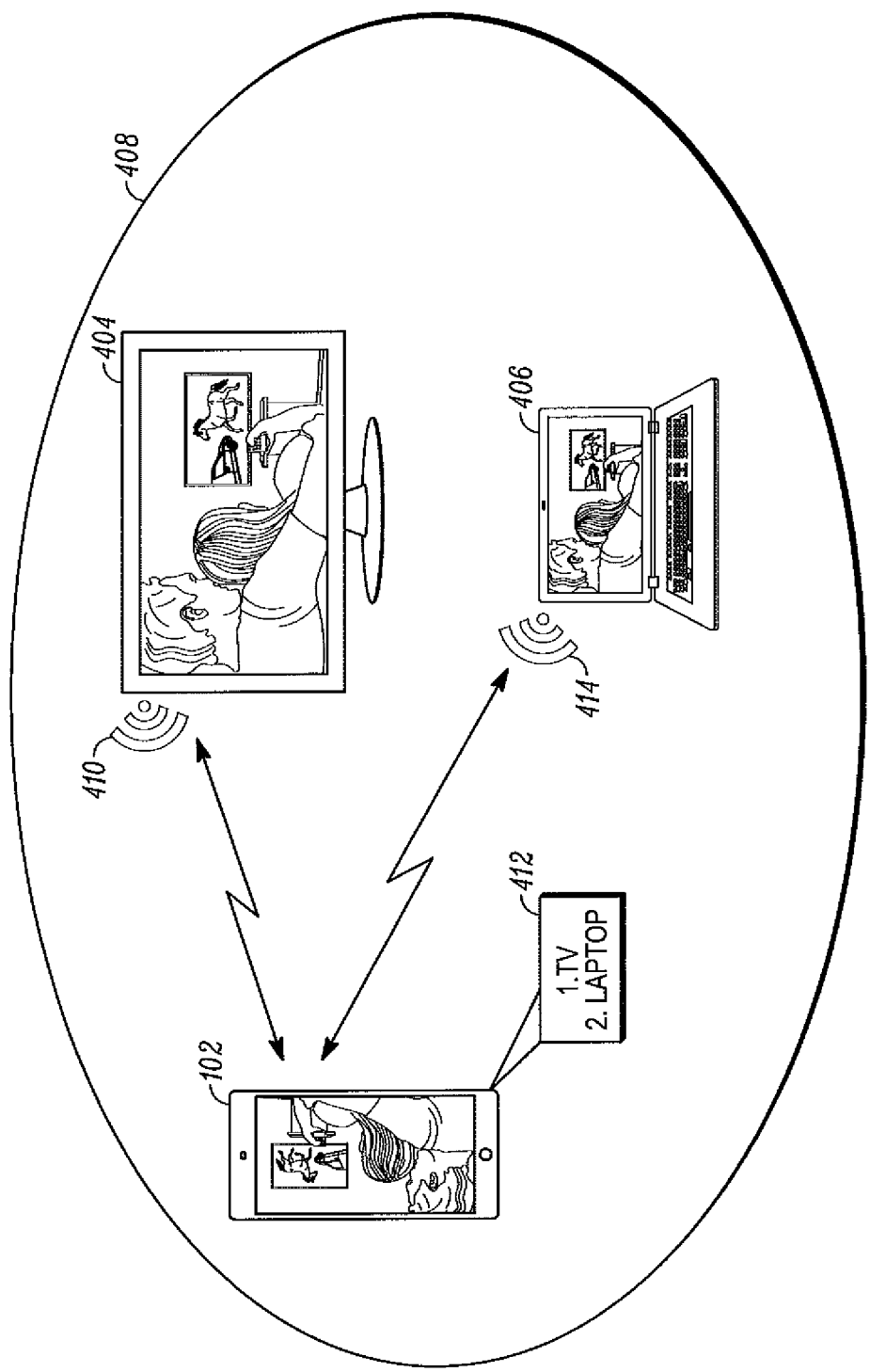
FIG. 4 is a schematic diagram illustrating an environment including a location area within which may be implemented embodiments of methods and devices for controlling sharing of selected content between a portable communication device and a plurality of selected target devices.

FIG. 3 illustrates a method 300 for controlling the sharing, for example controlling the playing, of selected content between a portable device, such as the portable device 102, and a selected target device. The portable device 102 determines 302 a list of one or more target devices in proximity to the portable device 102. A target device being in proximity to, close to, or near the portable device 102 means that the portable 102 and target devices are within wireless communication range as defined by one or more factors.

The factors can include, but need not be limited to: physical distance between the portable device 102 and the target device; whether a direct wireless connection or link can be established between the portable device 102 and the target device; and/or whether the target device can be sensed by one or more of the sensors 214 of the portable device 102. For a particular example, in proximity means within range for the portable 102 and target devices to communicate over a direct wireless connection or link using a wireless peer-to-peer (P2P) technology, such as Miracast, LTE-Direct, WiFi-Direct, or Bluetooth low-energy (BLE). A direct wireless connection or link is a wireless connection that enables communications between a portable device and one or more target devices without the use of an intermediary device such as a base station or access point.

The portable device 102 can use any suitable mechanism or method to determine the list of target devices in proximity to the portable device 102. For one embodiment, as illustrated by reference to FIG. 4, the portable device 102 is located within a location area 408. The portable device 102 determines the list of one or more target devices by accessing a stored list identifying one or more target devices within the location area 408. The list can be stored in a network to which the portable device 102 has access and/or stored locally, e.g., within the memory 208, in the portable device 102.

As an example, the location area 408 is a coverage area for a network, such as a Wi-Fi network for a business establishment like a restaurant. When the user 106 walks into the restaurant, the portable device 102 receives a transmission, e.g., a broadcast, of a list of monitors connected to the network and the capabilities of those monitors. The restaurant's network stores and wirelessly publishes the list of monitors.

Upon receiving the list of monitors, the portable device 102 stores, as the list of target devices, names and/or addresses of one or more of the monitors from the published list. Each monitor that the portable device 102 stores on the list of target devices is communicatively compatible with the portable device 102 to enable the sharing of selected content between the portable device 102 and the monitor.

For another example, the portable device 102 maintains within memory 208 the list of target devices associated with the location area 408, which in this case is the list of monitors in the restaurant. Accordingly, at some future time, when the portable device 102 determines through GPS, or another location mechanism, that the portable device 102 is within the restaurant, the portable device 102 can access the list of target monitors stored in its memory 208.

For another embodiment, the portable device 102 determines the list of target devices by receiving, from one or more proximal devices, a transmission indicating presence of the proximal device and generates the list of target devices using the received transmission(s). A proximal device is a device in proximity to the portable device 102. Presence is a status indicator that conveys capability and/or availability of the device for communication.

For instance, the user 106 is in his office or a room of his house 408 wherein is located a television 404 and a laptop 406. The television 404 sends, e.g., broadcasts, a transmission 410, such as a beacon, which includes information indicating communication capabilities, a name, and/or an address of the television 404. The fact that the beacon 410 is being sent can indicate availability of the television 404 for communications with another device. The beacon 410 can be sent using any suitable protocol or mechanism including, but not limited to, Wi-Fi, Bluetooth, infrared, near field communications (NFC), etc. Likewise, the laptop 406 sends a transmission 414, such as a beacon, which includes information indicating communication capabilities, a name, and/or an address of the laptop 406.

Upon receiving the transmissions 410, 414, the portable device 102 uses the information contained therein to determine that both devices 404 and 406 can serve as target devices. The portable device 102, thereby, stores a list 412 that includes the television 404 and the laptop 406 as target devices. This second embodiment of receiving transmissions from proximal devices and creating the list of target devices therefrom can be used in other implementation scenarios.

For a particular example scenario, the user 106 is in the restaurant with the multiple networked monitors. In this scenario, instead of the network publishing the list of monitors, each monitor implements a protocol or application, such as the Miracast standard, to broadcast a beacon that indicates the device's communication capabilities and address. Other information can be published such as the device name and location. The portable device 102 uses the information in these beacons to populate the list of target devices. For another example scenario, the user 106 boards an airplane or bus that has the monitor 104 in the seat 116. The monitor 104 broadcasts a beacon that is detected by the portable device 102 when the portable device is within communication range of the monitor 104. The portable device 102 uses information within the beacon to add the monitor 104 to a list of target devices or to create a list of target devices.

Returning to the method 300 of FIG. 3, at a time or during a time frame, the portable device 102 receives 304 a set of one or more non-tactile user commands that indicates selected content and that indicates a selected set of target devices from the list determined at 302. A non-tactile user command is a command resulting from a user interacting with a portable device without touching the portable device, except to physically move the device in space. Conversely, a tactile user command is a command resulting from a user touching the portable device, except when the user physically moves the device in space. For example, the processor 202 derives a tactile user command, for the portable device 102, from the user 106 touching one or more of the buttons 114 of the portable device 106 or making gestures, e.g., tracing a known path, onto a touchscreen integrated with the display 112.

The one or more non-tactile user commands that the portable device 102 receives 304 can include or be derived from a voice command, a spatial gesture, or a combination of one or more voice commands and spatial gestures. A voice command is a command derived from a user's utterance or speech, e.g., 118, received as input into the portable device 102. For example, the microphone 110 receives speech 118, which is provided to the voice processing module 216. The voice processing module 216 performs a speech-to-text analysis on the speech 118 and detects a voice command to "wake up" the portable device 102. The voice processing module 216 can then initiate a procedure to wake up the portable device such as by causing a main processor 202 and/or a display 112 to awaken from a low-power state to a high-power state.

A spatial gesture is a physical movement, e.g., 120, of the portable device 102 in space, which can be sensed for instance by the sensor hub 214, wherein the movement is associated with and defines a particular non-tactile user command to the portable device 102. For example, the user 106 shakes or waves the portable device 102 as indicated by 120 of FIG. 1. Movements of the portable device 102 along the x, y, and z axis are detectible by one or more of the sensors of the sensor hub 214 and can be translated, for instance by the processor 202, as a particular spatial gesture that provides a non-tactile user command to the portable device 102. For instance, the sensors 214 detect that portable device 102 was flipped from face-down to face-up, and the processor 202 translates that motion into a non-tactile user command to "wake up" the portable device 102.

For another example, the user 106 makes, with a hand or one or more fingers, gestures or motions in the vicinity of the portable device 102 without physically touching the portable device 102. The sensors of the sensor hub 214, such as one or more infrared detectors 226 or cameras (not shown), detect the user's motions or gestures, which the processor 202 translates into a non-tactile user command to the portable device 102 to perform an action. For instance, the user 106 waving a palm over the display 112 from the bottom to the top of the portable device 102, without touching the portable device 102, corresponds to a non-tactile user command to "wake-up" the portable device 102.

As mentioned earlier, the portable device 102 can receive 304 as the set of one or more non-tactile user commands, a voice command, a spatial gesture, or a combination of both, which indicates selected content and a selected set of one or more target devices from a list of target devices. For one scenario, the portable device 102 receives or detects 304 a voice command, which indicates both the selected content and the selected one or more target devices from the list. For instance, the user 106 is within location area 408, which in this scenario is a living room, and the portable device 102 has generated and stored the list 412 of target devices that includes the television 404 and the laptop 406. While in the living room 408, the user speaks 118 the words "stream movie 'abc' to the living room television." Upon receiving the speech 118 into the microphone 110, the portable device 102 launches the voice processing module 216, which identifies the utterance 118 as speech, using the VAD, and converts the speech into a text string. The voice processing module 216 identifies the text string as a non-tactile user command "stream" that indicates selected content "movie 'abc'" and a selected target device "television 404" from the list 412 of target devices.

For another scenario, the portable device 102 receives or detects 304 a combination of a voice command and a spatial gesture, which indicates the selected content and the selected one or more target devices from the list. For instance, while the user is in the living room 408, the user speaks 118 the words "stream movie 'abc'" and then points the portable device 102 toward the television 404. As before, upon receiving the speech 118 into the microphone 110, the portable device 102 launches the voice processing module 216, which identifies the utterance 118 as speech, using the VAD, and converts the speech into a text string. The voice processing module 216 identifies the text string as a non-tactile user command "stream" that indicates selected content "movie 'abc.'" However, in this scenario, the portable device 102 identifies the television 404 as the selected target device by detecting the gesture or movement 120 associated with the user 106 pointing toward the television 404.

Figure 5:
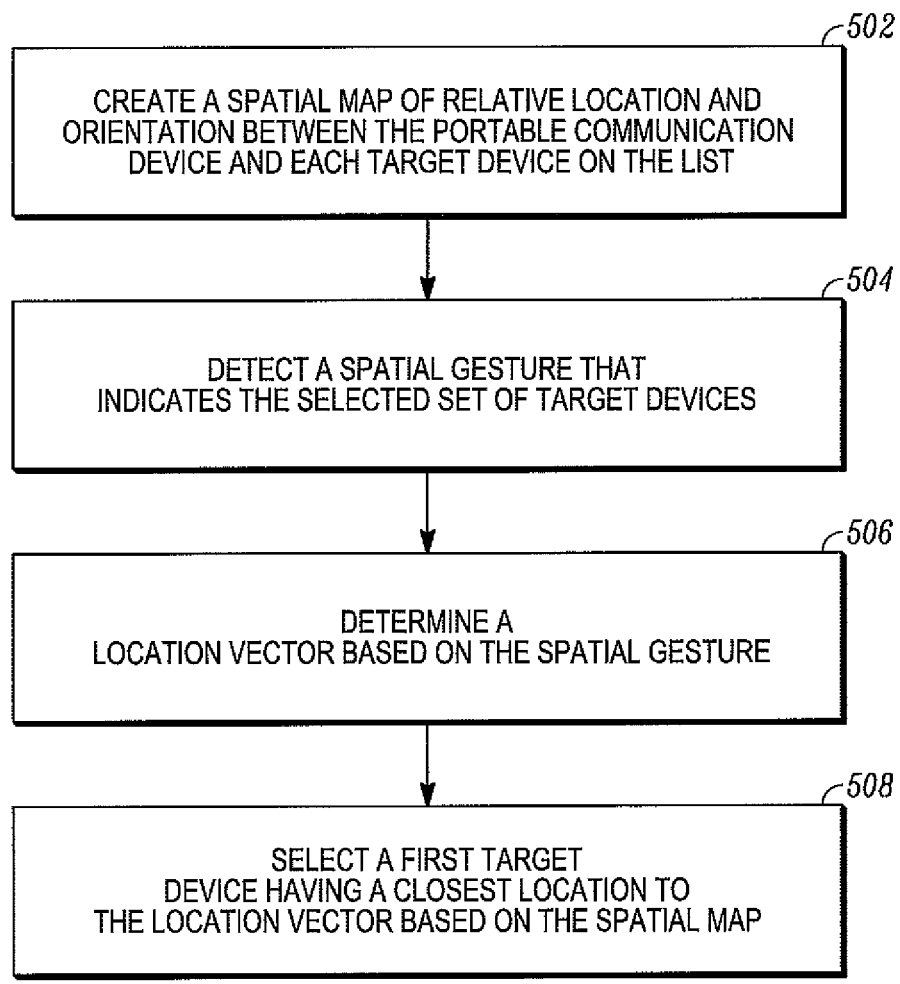
FIG. 5 is a flow diagram illustrating an embodiment of a method for creating a spatial map of relative location and orientation between a portable communication device and each target device on a list.

To aid the portable device 102 in identifying the selected target device 404 from the user's gesture, for an embodiment, the portable device 102 performs a method 500 illustrated in FIG. 5. Namely, the portable device 102 creates 502 a spatial map of relative location and orientation between the portable device 102 and each target device 404, 406 on the list 412 of target devices. For instance, when or after the portable device 102 determines or generates 302 the list 412 of target devices, the portable device 102 creates a spatial map of relative location and orientation between the portable device 102 and each of the television 404 and the laptop 406.

For an example, the portable device 102 receives location coordinates or other location data and orientation information or data from the television 404 and the laptop 406. Such data can be received with or separately from the capability information and address information received for the device 404 and 406 and used to determine the list 412 of target devices. Such data can, alternatively, be known a priori, such as when a target device has a fixed location. Moreover, the portable device 102 determines its own location coordinates or other location data and its orientation information or data.

The portable device 102 applies a suitable algorithm to the location and orientation data to, for instance, determine distance between the portable device 102 and each device 404 and 406 and from the distance and orientation data to determine relative location and orientation to each of the devices 404 and 406 to generate or populate the spatial map. For a particular implementation, the relative location and orientation between the portable device 102 and a target device is represented as a vector having direction and magnitude, referred to herein as a target vector. For this example, the spatial map would contain two target vectors, one associated with the target device 404 and one associated with the target device 406.

The portable device 102 and/or the target devices 404, 406 can determine device location using one or more techniques and/or hardware elements including, but not limited to, GPS, cellular network triangulation, beacon triangulation, trilateration, wireless network mapping, ultrasonic location, image-based location, etc. The portable device 102 and/or the target devices 404, 406 can determine device orientation using one or more techniques and/or hardware elements including, but not limited to, a compass to determine cardinal direction, an accelerometer to determine up/down or gravity, a gyroscope, an IR array, ultrasonic orientation, imaged-based orientation, magnetic tracking, etc.

The portable device 102, at block 504, detects a spatial gesture, for instance by detecting, using one or more of the sensors 214, movement 120 resulting from the user 106 pointing the portable device 102. The portable device 102 determines 506 a vector, referred to herein as a location vector, based on the spatial gesture. For example, when the portable device 102 determines the selected content from the voice command but is unable to determine one or more selected target devices from the voice command, this can trigger the portable device 102 to monitor for a spatial gesture. The portable device 102 determines 504 that the movement 120 received close in time, e.g., within a threshold time frame, from the voice command is the relevant spatial gesture.

At the conclusion of the movement 120, the portable device 102 determines 506 a location vector based on the spatial gesture. For instance, the portable device 102 determines its location and orientation and determines a location vector that represents this location and orientation. In one example, the location vector has an orientation that projects from the portable device 102 in the direction of the spatial gesture at a predetermined distance. The predetermined distance can be based on the size of the living room 408. The portable device 102 compares the location vector to the target vectors for devices 404 and 406 contained in the spatial map and selects 508 the television 404 as the target device. Selecting the television 404 results from determining that the target vector for the television 404 is closest in direction to the location vector. In this manner, the portable device 102 selects 508 a target device, wherein the selected target device has a closest location to the location vector based on the spatial map.

For another scenario, the set of non-tactile user commands, which the portable device 102 receives at block 306 of the method 300, results from a dialog exchange between the portable device 102 and the user 106 of the portable device 102. A dialog exchange involves the portable device 102 receiving speech 118 into the microphone 110 with at least some part of the speech 118 resulting from a prompt output by the portable device 102. The prompt can be, for instance, an audio prompt output by the speakers 108, a visual prompt output on the display 112, or a combination thereof.

For example, while the user 106 is in the living room 408, the user 106 speaks 118 the words "stream movie 'abc.'" The potable device 102 uses the voice processing module 216 to convert the voice 118 to text and determine, therefrom, the non-tactile user command "stream" and the selected content "movie 'abc,'" which was indicated. Upon not detecting a further non-tactile user command, either a voice command or a spatial gesture, after a predetermined amount of time, the portable device 102 outputs a prompt "stream movie 'abc' to which device" using the speaker 108, the display 112, or both. The user 106 can respond using a voice command or a gesture or both, indicating whether to stream movie 'abc' to the television 404 or the laptop 406, for detection by the portable device 102 as a non-tactile user command indicating the selected target device.

For other examples, the dialog exchange includes multiple prompts by the portable device 102. For instance, in response to the prompt "stream movie 'abc' to which device," the user 106 points the portable device 102 toward the television 404. The portable device 102 could output a confirmation prompt "you want to stream movie 'abc' to the television," to which the user 106 could verbally reply "yes." Alternatively, in response to the prompt "stream movie 'abc' to which device," the user 106 could say "the television." In this instance, likewise, the portable device 102 could output a confirmation prompt "you want to stream movie 'abc' to the television," to which the user 106 could verbally reply "yes."

After determining the selected content and the selected set of target devices, the portable device 102 controls 308 the sharing, e.g., the playing, of the selected content between the portable device 102 and the selected set of target devices. Some examples of controlling the sharing of the selected content between the portable device 102 and a selected target device are illustrated by reference to FIGS. 6 to 12, which are described in detail later.

For another embodiment, the portable device 102 triggers 306 a start of a control session for controlling the sharing of the selected content between the portable device 102 and the selected set of target devices. A "control session" represents a period of time having definite beginning and end times, within which the portable device 102 monitors for non-tactile user commands to control the sharing of the selected content between the portable device 102 and the selected set of target devices. For particular embodiments, the start of the control session is triggered using the set of non-tactile user commands that indicates the selected content and selected set of target devices, a set of one or more tactile user commands, or both.

For example, before speaking the non-tactile user command that indicates the selected content, the user speaks a trigger phrase that triggers the portable device 102 to start a control session to monitor for the set of non-tactile user commands to control the sharing of selected content between the portable device 102 and a set of selected target devices. For one implementation, the user 106 says "start Moto play, stream movie 'abc.'" Upon generating the text string "start Moto play, stream movie 'abc,'" the voice processing module 216 interprets the text string "start Moto play" as a trigger phrase to start a control session to monitor for non-tactile user commands to control the sharing of selected content between the portable device 102 and a set of selected target devices.

For another example, before speaking the phrase "stream movie 'abc,'" the user 106 presses a certain button or icon or series of buttons or icons on the portable device 102, which the portable device 102 detects as the trigger to start a control session to monitor for non-tactile user commands to control the sharing of selected content between the portable device 102 and a set of selected target devices. For yet another example, before speaking the phrase "stream movie 'abc,'" the user 106 moves the portable device 102 in a certain manner, which the portable device 102 detects as the trigger to start the control session to monitor for non-tactile user commands to control the sharing of selected content between the portable device 102 and a set of selected target devices.

The control session for controlling the sharing of selected content between the portable device 102 and a set of selected target devices continues until the portable device 102 receives 310 a trigger to end the control session, whereupon the portable device 102 ends 320 the control session. For one particular embodiment, the portable device 102 detects 318 an explicit command as the received 310 trigger to end 320 the control session. For one example, the portable device 102 detects a voice command, such as the words "stop Moto play" spoken by the user 106, as the explicit command to end the control session. For another example, the portable device 102 detects a gesture, such as a movement of the portable device 102 or of the user's hand over the device 102, as the explicit command to end the control session. For yet another example, the portable device 102 detects a tactile user input, such as the depression of a certain button or icon, as the explicit command to end the control session.

For some embodiments, the portable device 102 detects 310 an implicit trigger to end the control session. For one example, the portable device 102 detects 312 that the selected content is playing on the portable communication device; and this detection serves as the trigger to end 320 the control session. For one use case, the portable device 102 receives 304 a non-tactile user command that triggers 306 the start of a control session for controlling 308 the playing of a selected movie between the portable device 102 and the television 404, which is the selected target device. In this use case, the non-tactile user command is for streaming a selected movie on the portable device 102 that was streaming on the television 404. Accordingly, when the portable device 102 detects that the movie is streaming on the portable device 102, the portable device 102 ends 320 the control session.

For another example, the portable device 102 detects 314 a command to a first target device to play the selected content; and this detection serves as the trigger to end 320 the control session. For instance, as before, the portable device 102 receives 304 a non-tactile user command that triggers 306 the start of a control session for controlling 308 the playing of a selected movie between the portable device 102 and the television 404, which is the selected target device. This time, the non-tactile user command is for streaming a selected movie on the television 404 that was streaming on the portable device 102. Accordingly, when the portable device 102 detects the sending of an instruction or command from the portable device 102 to the television 404 to stream the selected movie, the portable device 102 ends 320 the control session.

For another example, the portable device 102 detects 316 an elapse of a first amount of time without receiving an additional non-tactile user command; and this detection serves as the trigger to end 320 the control session. This example implementation enables the receipt of multiple non-tactile user commands, for instance associated with the playing of a particular selected content. Take the use case of where the portable device 102 receives 304 a non-tactile user command that triggers 306 the start of a control session for controlling 308 the streaming of a selected movie on the television 404 that was streaming on the portable device 102. Once the portable device 102 starts the control session and instructs the television 404 to stream the movie, the portable device 102 can set a timer for a predetermined or programmed time period and monitor for additional non-tactile user commands. The non-tactile user commands could be or result from a voice command, a spatial gesture, or a combination thereof, which commands the portable device 102 to direct or instruct the television 404 to stop, rewind, fast forward, or pause, the content. When no additional non-tactile user command is received before the expiration of the timer or within a time period determined by the timer, the portable device 102 ends 320 the control session.

As mentioned earlier, some examples of controlling the sharing of the selected content between the portable device 102 and at least one selected target device are illustrated by reference to FIGS. 6 to 12. More particularly, these figures each illustrate an example message sequence diagram, 600, 700, 800, 900, 1000, 1100, and 1200, respectively, showing signaling between multiple devices and functionality at one or more of the devices to control the sharing of selected content between the portable device 102 and at least one selected target device. For one embodiment, the signaling to establish wireless links and the signaling to send messages between the devices carrying control instructions and data is performed using the Miracast standard. However, in other embodiments, one or more different standard protocols, such as LTE-Direct, WiFi-Direct, BLE, NFC, Wi-Fi, etc., or proprietary protocols can be used in addition to or alternative to the Miracast standard to perform the requisite signaling of FIGS. 6 to 12.

Figure 6:
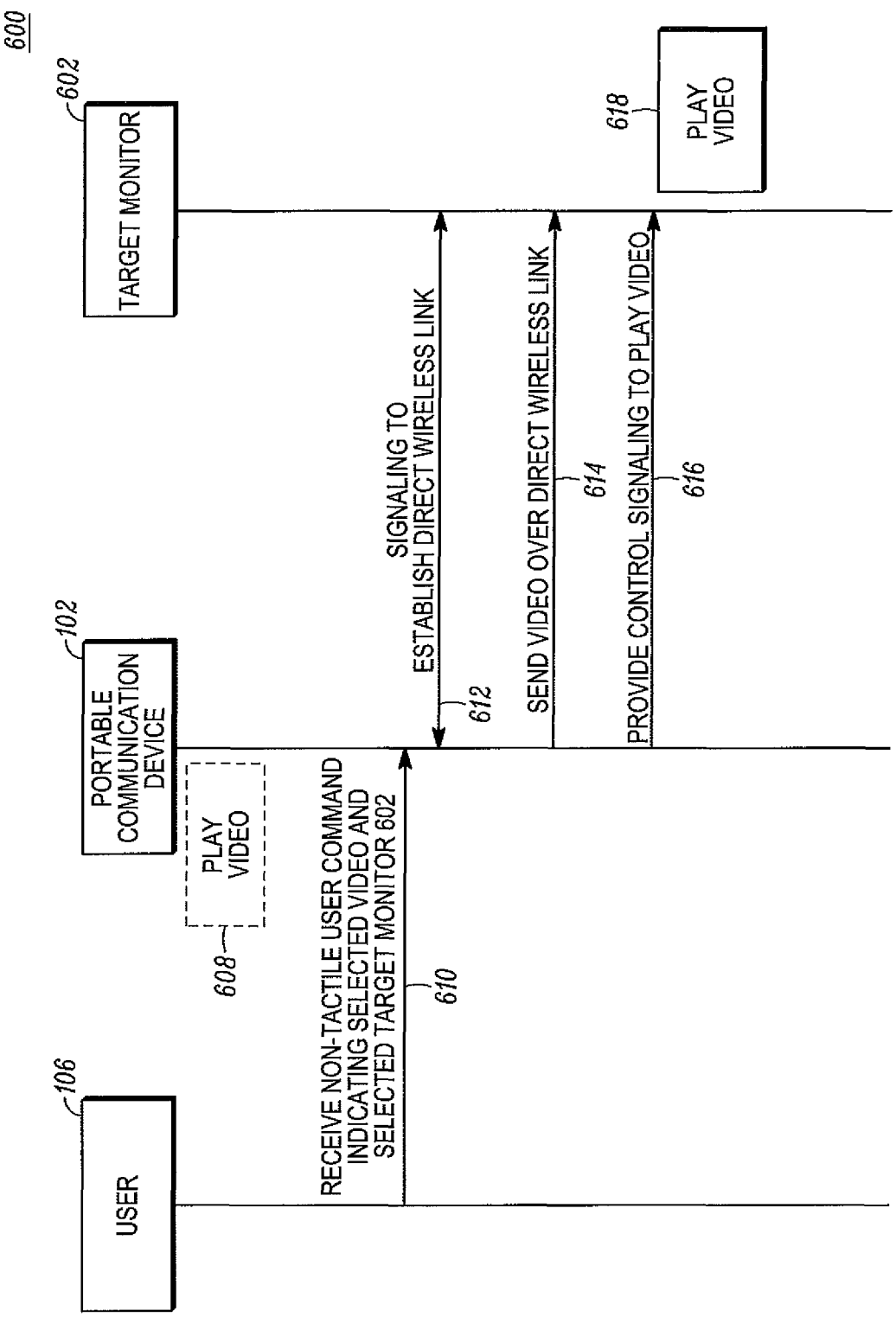
FIG. 6 is a message sequence diagram illustrating an embodiment for controlling the sharing and playing of selected content between a portable communication and a selected target device.

FIG. 6 illustrates an embodiment wherein controlling the playing of the selected content between the portable device 102 and the selected set of target devices includes the portable device 102 sending, over a direct wireless link to a first target device of the selected set of target devices, the selected content for playing on the first target device. For example, the user 106 walks into a restaurant having multiple monitors and desires to play selected content on a target monitor 602 of the multiple monitors, wherein the portable device 102 provides the selected content. FIG. 6, thereby, shows a message sequence diagram 600 illustrating example signaling between the portable device 102 and the selected target monitor 602 for controlling the playing of the selected content between the portable device 102 and the target monitor 602.

The portable device 102 receives 610 a non-tactile user command from the user 106 indicating a selected video and the selected target monitor 602. The selected video can be video that is playing 608 on the portable device 102, such as video stored locally in the memory 208 of the portable device 102. The portable device 102 and the selected target monitor 602 exchange signaling 612 to establish a direct wireless link, wherein the particular signaling depends on the protocol used to establish the direct link. Once the link is established, the portable device 102 sends 614 the selected video over the direct wireless link and also provides 616 control signaling, consistent with the protocol used, to direct the target monitor 602 to play the video. Responsively, the target monitor 602 plays 618 the selected video.

Figure 7:
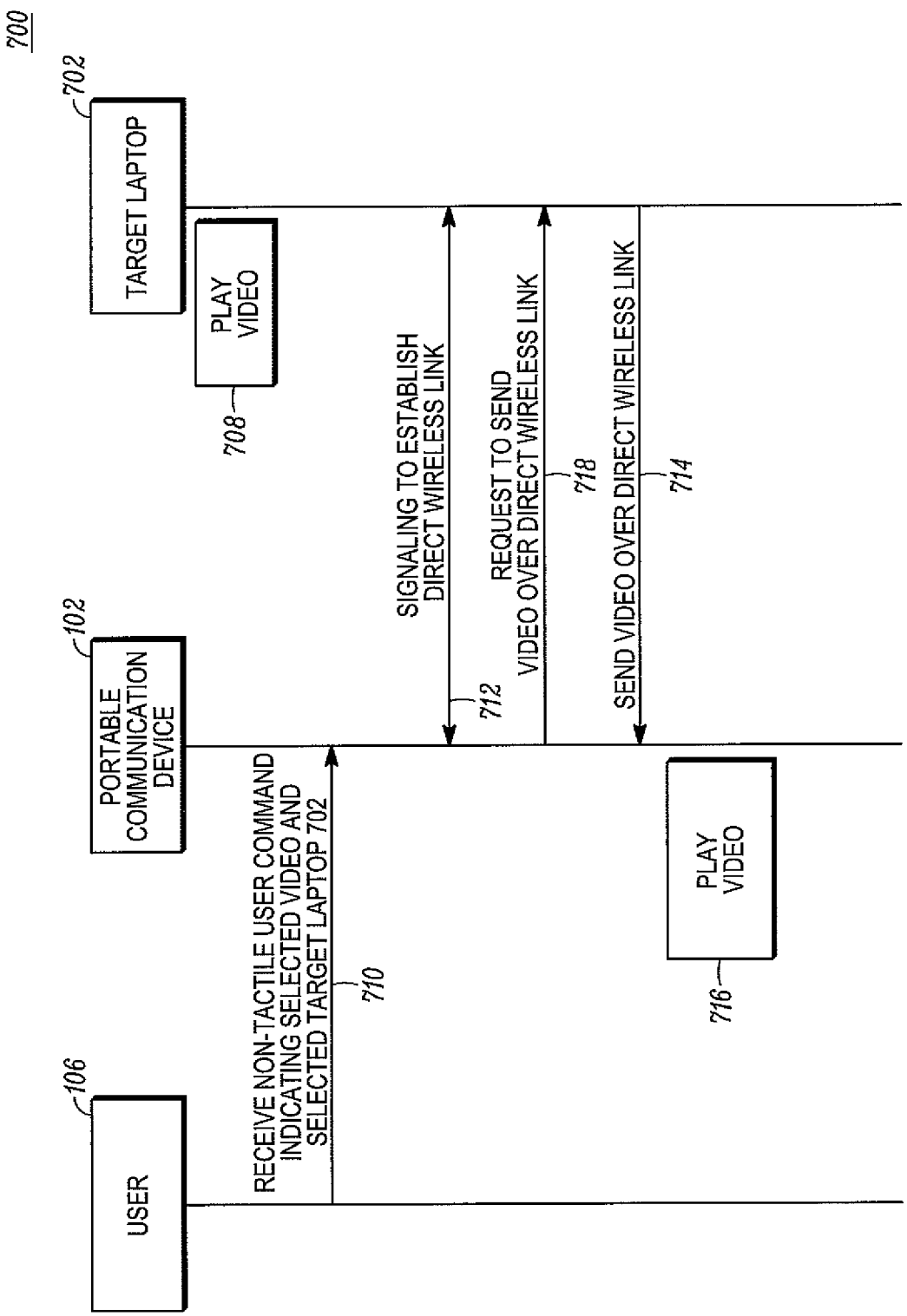
FIG. 7 is a message sequence diagram illustrating an embodiment for controlling the sharing and playing of selected content between a portable communication and a selected target device.

FIG. 7 illustrates an embodiment wherein controlling the playing of the selected content between the portable device 102 and the selected set of target devices includes the portable device 102 receiving, over a direct wireless link to a first target device of the selected set of target devices, selected content for playing on the portable device 102. For example, the user 106 is in her office watching content playing 708 on a laptop 702. The user 106 wants to leave the office but continue watching the content on her portable device 102. FIG. 7, thereby, shows a message sequence diagram 700 illustrating example signaling between the portable device 102 and the selected target laptop 702 for controlling the playing of the selected content between the portable device 102 and the target laptop 702.

The portable device 102 receives 710 a non-tactile user command from the user 106 indicating a selected video and the selected target laptop 702. The selected video can be video that is stored locally in the memory of the target laptop. The portable device 102 and the selected target laptop 702 exchange signaling 712 to establish a direct wireless link, wherein the particular signaling depends on the protocol used to establish the direct link. Once the link is established, the portable device 102 sends 718 control signaling, consistent with the protocol used, to direct or request the target laptop 702 to send the selected video to the portable device 102. Responsively, the target laptop 702 sends 714 the selected video to the portable device 102 over the established link, and the portable device 102 plays 716 the video.

Figure 8:
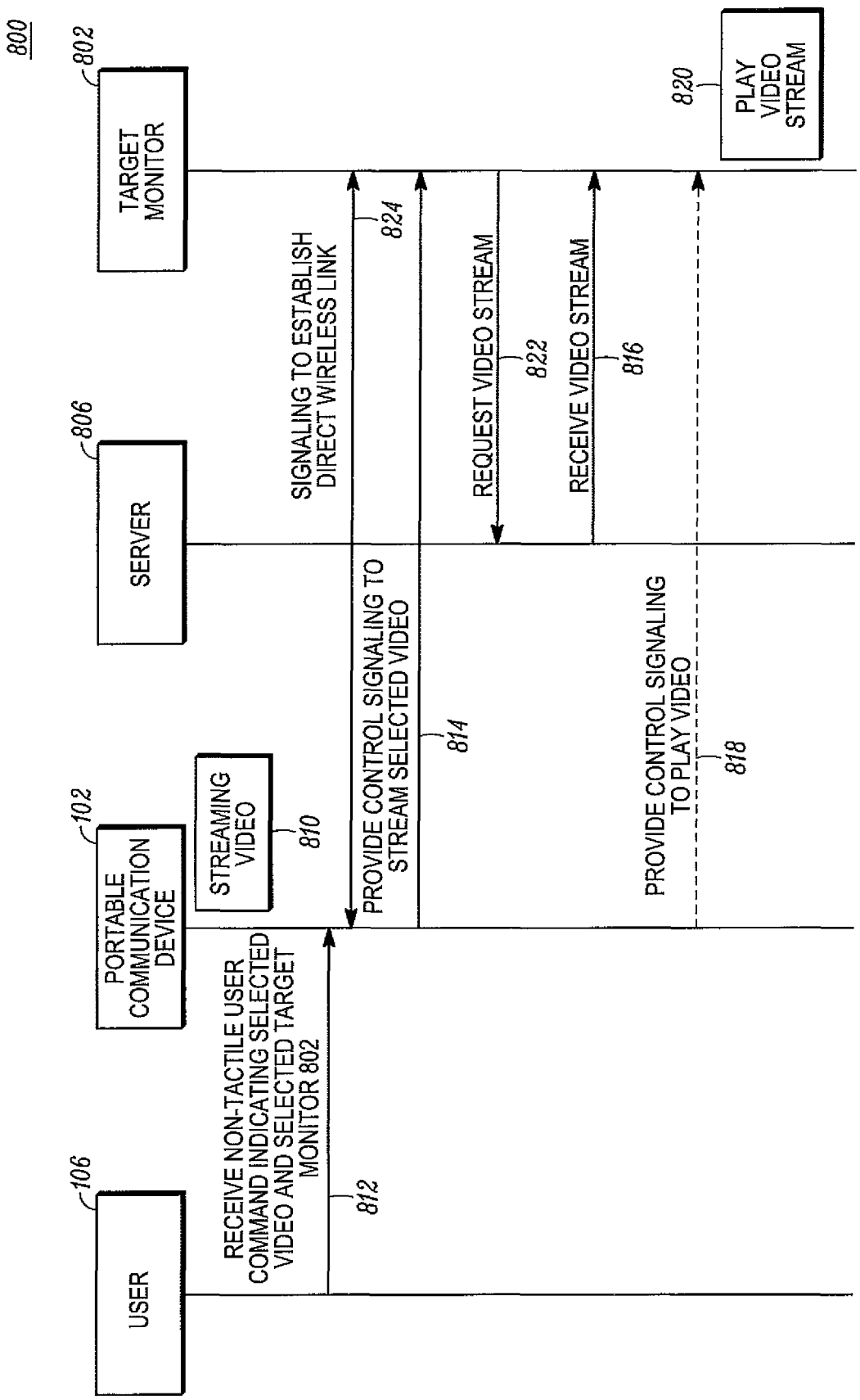
FIG. 8 is a message sequence diagram illustrating an embodiment for controlling the sharing and playing of selected content between a portable communication device and a selected target device.

FIG. 8 illustrates an embodiment wherein controlling the playing of the selected content between the portable device 102 and the selected set of target devices includes the portable device 102 directing a first target device of the selected set of target devices to download from a server the selected content, which is also accessible to the portable device 102, for playing on the first target device. For example, the user 106 walks into a restaurant having multiple monitors and desires to play selected content on a target monitor 802 of the multiple monitors, wherein the portable device 102 is streaming 810 the selected content. FIG. 8, thereby, shows a message sequence diagram 800 illustrating example signaling between the portable device 102 and the selected target monitor 802 for controlling the playing of the selected content between the portable device 102 and the target monitor 802.

The portable device 102 receives 812 a non-tactile user command from the user 106 indicating selected video and the selected target monitor 802. The selected video can be video that is streaming 810 on the portable device 102 from a server 806. The portable device 102 and the selected target monitor 802 exchange signaling 824 to establish a direct wireless link, wherein the particular signaling depends on the protocol used to establish the direct link. Once the wireless link is established, the portable device 102 provides 814 control signaling, consistent with the protocol used, to direct the target monitor 802 to stream the selected video from the server 806. The control signaling identifies the target video via a link or other identifier and identifies the server 806 using an address or other identifier.

Responsively, the target monitor 802 requests 822 and receives 816 the video stream from the server 806. For one implementation, the target monitor 802 plays 820 the video, without any further instruction, upon receiving 816 the video stream from the server 806. Alternatively, the portable device 102 provides 818 control signaling to the target monitor 802 to play the video, to which the target monitor 802 responsively plays 820 the video stream from the server 806. Video streaming can be performed using any suitable protocol including, but not limited to, MP3, MP4, H.264, HEVC, WebM, etc. for audio and video stream encoding and decoding, and Real-time Streaming Protocol (RTSP), Real-time Transport Protocol (RTP), Real-time Transport Control Protocol (RTCP), etc., for streaming the content over a network.

Figure 9:
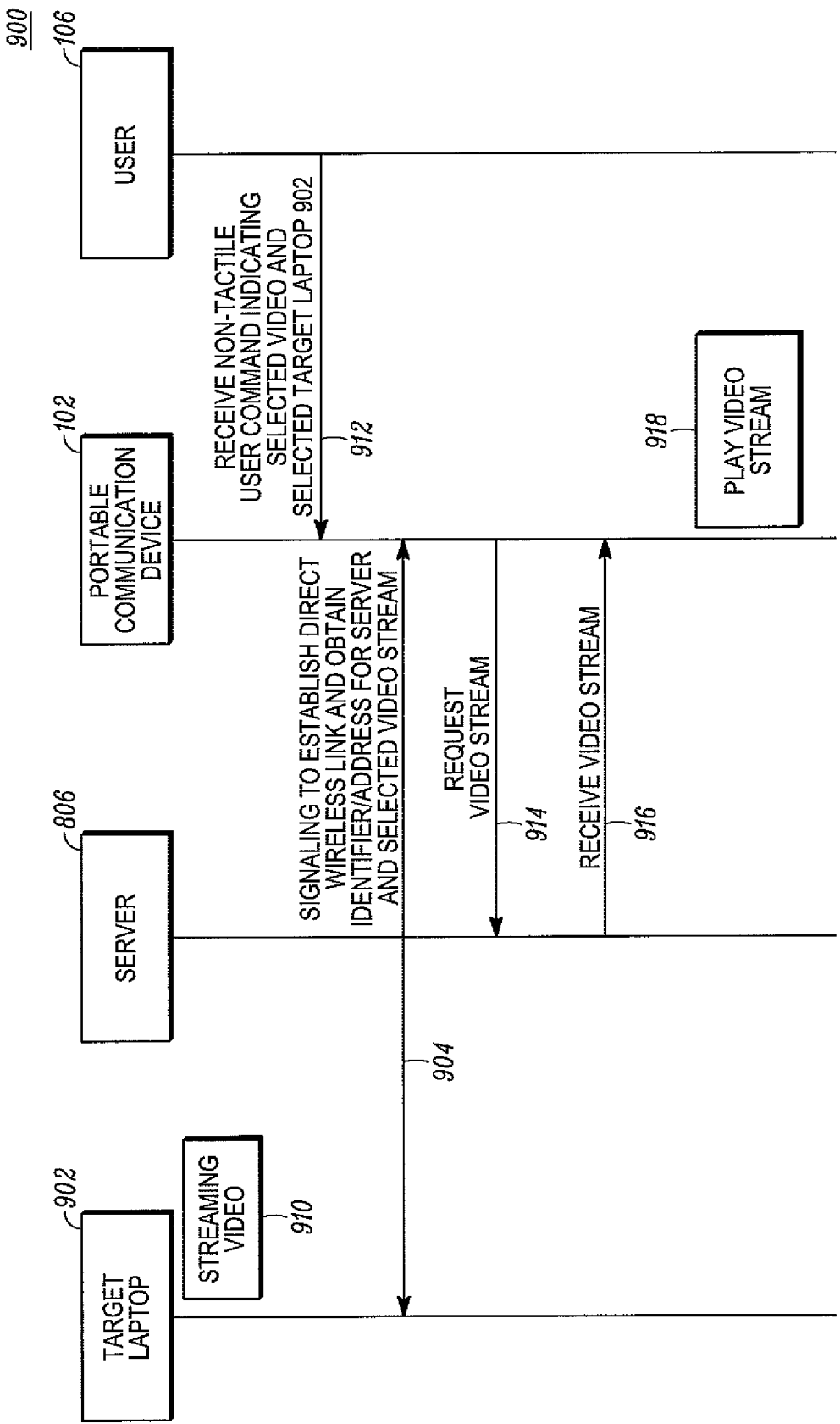
FIG. 9 is a message sequence diagram illustrating an embodiment for controlling the sharing and playing of selected content between a portable communication device and a selected target device.

FIG. 9 illustrates an embodiment wherein controlling the playing of the selected content between the portable device 102 and the selected set of target devices includes the portable device 102 directing a server to send to the portable device 102 the selected content, which is also accessible to a first target device of the selected set of target devices, for playing on the portable device 102. For example, the user 106 is in her office watching content streaming 910 to a laptop 902. The user 106 wants to leave the office but continue the streaming the content, but to her portable device 102. FIG. 9, thereby, shows a message sequence diagram 900 illustrating example signaling between the portable device 102 and the selected target laptop 902 for controlling the playing of the selected content between the portable device 102 and the target laptop 902.

The portable device 102 receives 912 a non-tactile user command from the user 106 indicating the selected target laptop 902 and the selected video streaming on the laptop 902 from a server 906. The portable device 102 and the selected target laptop 902 exchange signaling 904 to establish a direct wireless link and for the portable device 102 to obtain, from the laptop 902, a link or other identifier for the video stream and an address or other identifier for the server 906. The particular signaling depends on the protocol used to establish the direct link and to exchange information using the link. Once the link is established, the portable device 102 requests 914 and receives 916 the selected video stream, which the portable device 102 plays 918. Video streaming can be performed using any suitable protocol including, but not limited to, MP3, MP4, H.264, HEVC, WebM, etc. for audio and video stream encoding and decoding, and RTSP, RTP, RTCP, etc., for streaming the content over a network.

Figure 10:
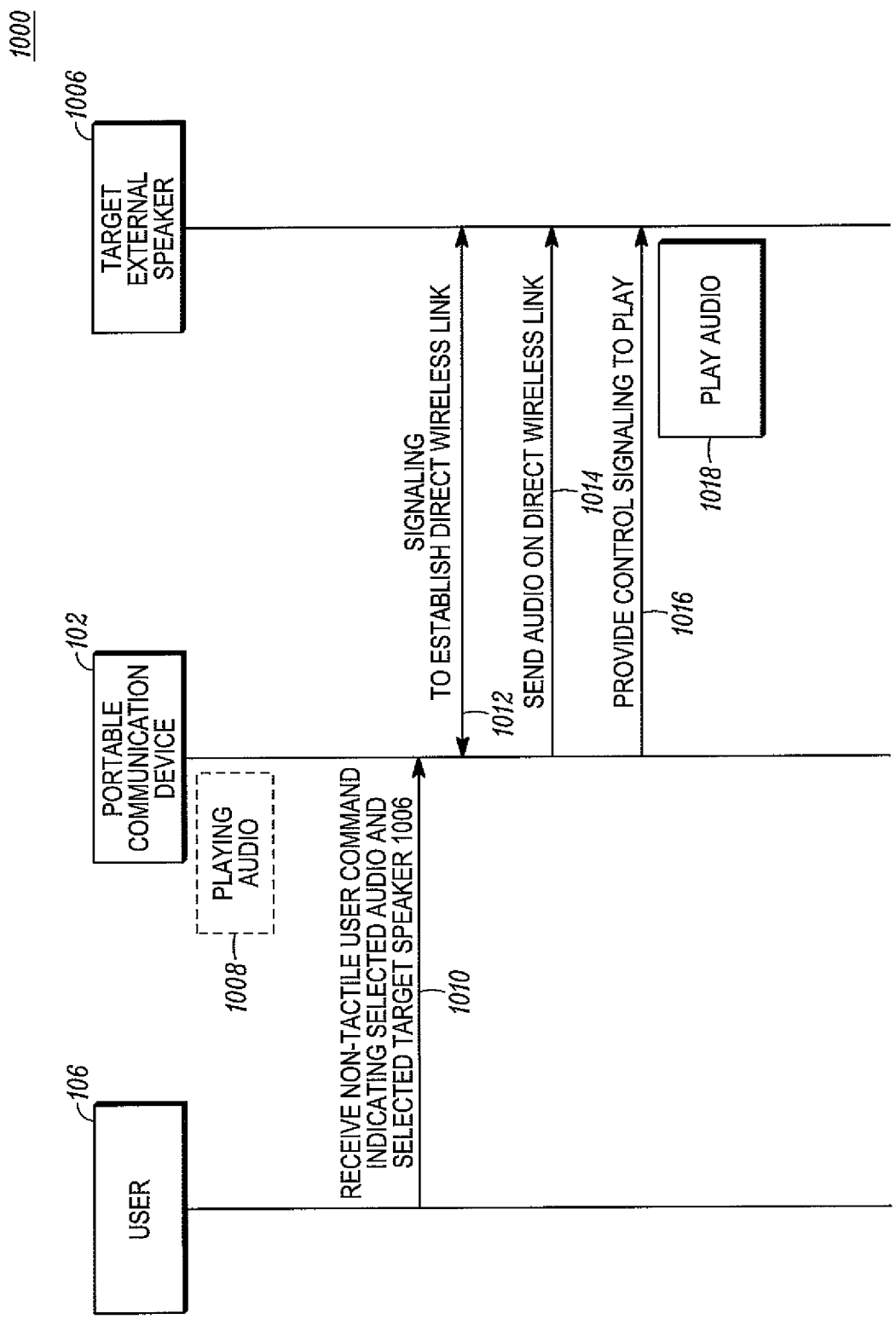
FIG. 10 is a message sequence diagram illustrating an embodiment for controlling the sharing and playing of selected content between a portable communication device and a selected target device.

FIG. 10 illustrates an embodiment wherein controlling the playing of the selected content between the portable device 102 and the selected set of target devices includes the portable device 102 causing selected audio accessible to the portable device 102 to play on an external speaker of the selected set of target devices. For example, the user 106 has audio, such as songs, on the portable device 102 and desires to play selected audio on a selected target external speaker 1006, wherein the portable device 102 provides the selected audio. FIG. 10, thereby, shows a message sequence diagram 1000 illustrating example signaling between the portable device 102 and the selected target external speaker 1006 for controlling the playing of the selected content between the portable device 102 and the target external speaker 1006.

The portable device 102 receives 1010 a non-tactile user command from the user 106 indicating selected audio and the selected target speaker 1006. The selected audio can be audio that is playing 1008 on the speakers 108 of the portable device 102, such as audio stored locally in the memory 208 of the portable device 102. The portable device 102 and the selected target speaker 1006 exchange signaling 1012 to establish a direct wireless link, wherein the particular signaling depends on the protocol used to establish the direct link. Once the link is established, the portable device 102 sends 1014 the selected audio over the direct wireless link and also provides 1016 control signaling, consistent with the protocol used, to direct the target speaker 1006 to play the audio. Responsively, the target speaker 1006 plays 1018 the selected audio.

Figure 11:
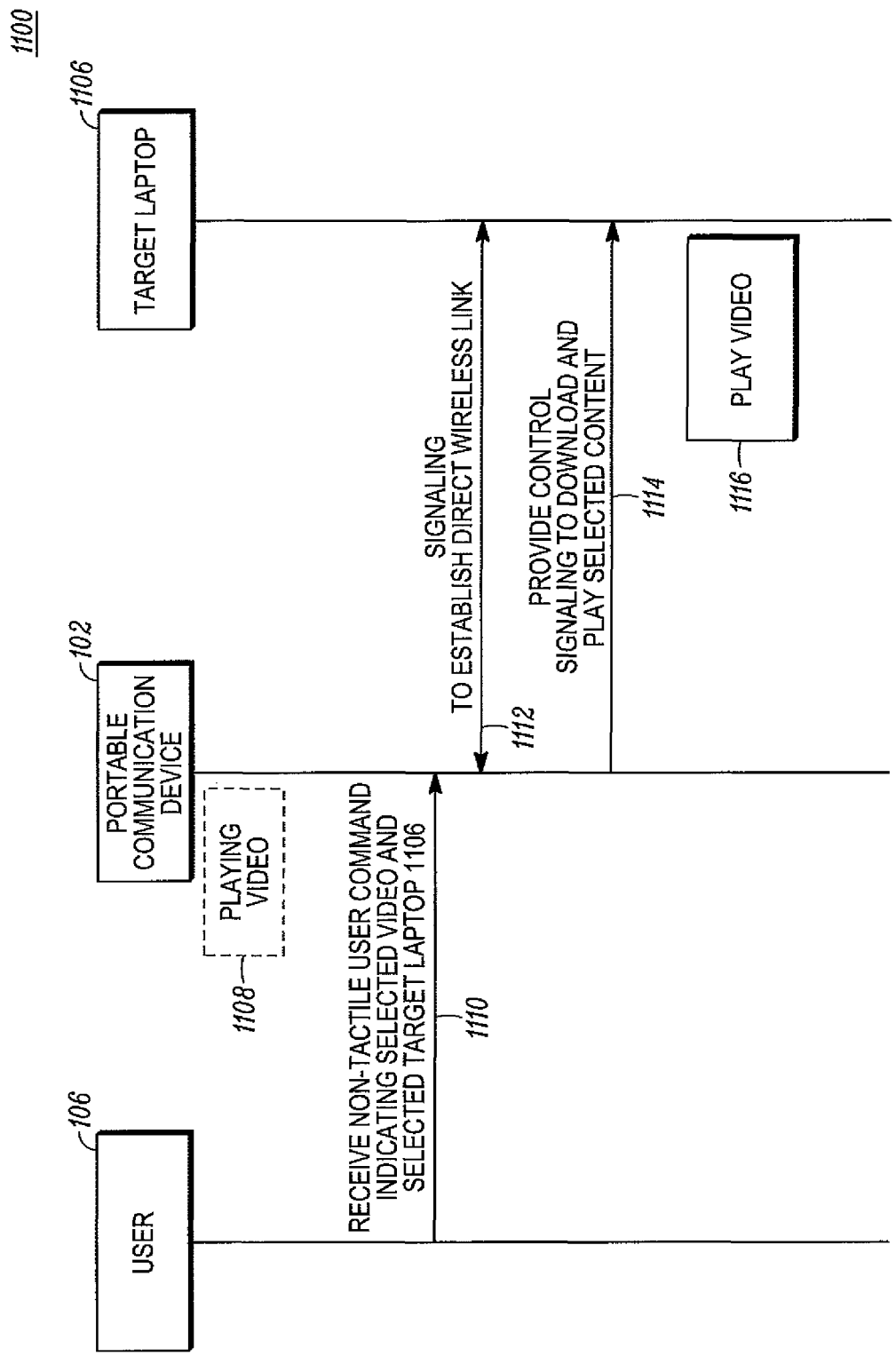
FIG. 11 is a message sequence diagram illustrating an embodiment for controlling the sharing and playing of selected content between a portable communication device and a selected target device.

FIG. 11 illustrates an embodiment wherein controlling the playing of the selected content between the portable device 102 and the selected set of target devices includes the portable device 102 directing a first target device of the selected set of target devices to play the selected content, which is stored on the first target device and the portable device 102. For example, the user 106 walks into her office where his laptop 1106 is located and desires to watch video on the laptop 1106. FIG. 11, thereby, shows a message sequence diagram 1100 illustrating example signaling between the portable device 102 and the selected target laptop 1106 for controlling the playing of the selected video between the portable device 102 and the target laptop 1106.

The portable device 102 receives 1110 a non-tactile user command from the user 106 indicating a selected video and the selected target laptop 1106. The selected video can be video that is playing 1108 on the portable device 102, such as video stored locally in the memory 208 of the portable device 102 or video stored in the cloud. The portable device 102 and the target laptop 1106 exchange signaling 1112 to establish a direct wireless link, wherein the particular signaling depends on the protocol used to establish the direct link. Once the link is established, the portable device 102 provides 1114 control signaling to the target laptop 1106, over the direct link, to download and play the selected video. Responsively, the target laptop 1106 downloads the selected video from local storage or from the cloud and plays 1116 the selected video.

FIG. 12 illustrates an embodiment wherein controlling the playing of the selected content between the portable device 102 and the selected set of target devices includes the portable device 102 broadcasting the selected content to multiple target devices of the selected set of target devices. Herein, broadcasting means making content available for receipt by multiple devices. For example, a teacher 106 wants to send selected content to target devices 1206, 1208 of two students seated in his classroom. FIG. 12, thereby, shows a message sequence diagram 1200 illustrating example signaling between the portable device 102 and the selected target devices 1206, 1208 for controlling the playing of the selected content between the portable device 102 and the target devices 1206, 1208.

The portable device 102 receives 1212 a non-tactile user command from the user 106 indicating selected content and the selected target devices 1206, 1208. The selected content can be video or audio that is playing 1210 on the portable device 102, such as video or audio stored locally in the memory 208 of the portable device 102. The portable device 102 and the target devices 1206, 1208, exchange signaling 1214 and 1216, respectively, to establish a direct wireless link, wherein the particular signaling depends on the protocol used to establish the direct link. Once the link is established, the portable device 102 broadcasts 1218, 1220 the selected content over the direct wireless link and also provides control signaling, consistent with the protocol used, to direct the target devices 1206, 1208 to play the content. Responsively, the target devices 1206, 1208, respectively, play 1222, 1224 the selected content.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

A device or structure that is "configured" in a certain way is configured in at least that way, but may also be configured in ways that are not listed. As used herein, the terms "configured to", "configured with", "arranged to", "arranged with", "capable of" and any like or similar terms mean that hardware elements of the device or structure are at least physically arranged, connected, and or coupled to enable the device or structure to function as intended.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method performed by a portable communication device, the method comprising:
   determining a list of at least one target device in proximity to the portable communication device;
   creating a spatial map of relative location and orientation between the portable communication device and each target device on the list;
   determining, by the portable communication device, a target vector for each target device in the list based on the spatial map, wherein each target vector corresponds to the relative location and orientation between the portable device and each target device;
   receiving a voice command that indicates selected content and a selected set of target devices;
   determining that the voice command is unable to identify one or more of the selected set of target devices, and responsively causing the portable communication device to monitor for a spatial gesture command within a threshold period of time after receiving the voice command;
   receiving the spatial gesture command within the threshold period of time after receiving the voice command;
   determining a location vector based on the spatial gesture command;
   determining at least one target device of the selected set of target devices on the list based on a comparison of the location vector to each determined target vector; and
   controlling sharing of the selected content between the portable communication device and the at least one target device of the selected set of target devices, wherein controlling the sharing of the selected content comprises controlling the playing of the selected content between the portable communication device and the at least one target device of the selected set of target devices.

2. The method of claim 1, wherein controlling the playing of the selected content between the portable communication device and the at least one target device of the selected set of target devices comprises the portable communication device sending, over a direct wireless link to a first target device of the at least one target device of the selected set of target devices, the selected content for playing on the first target device.

3. The method of claim 1, wherein controlling the playing of the selected content between the portable communication device and the at least one target device of the selected set of target devices comprises the portable communication device receiving, over a direct wireless link to a first target device of the at least one target device of the selected set of target devices, the selected content for playing on the portable communication device.

4. The method of claim 1, wherein controlling the playing of the selected content between the portable communication device and the at least one target device of the selected set of target devices comprises the portable communication device directing a first target device of the at least one target device of the selected set of target devices to download from a server the selected content, which is also accessible to the portable communication device, for playing on the first target device.

5. The method of claim 1, wherein controlling the playing of the selected content between the portable communication device and the at least one target device of the selected set of target devices comprises the portable communication device directing a server to send to the portable communication device the selected content, which is also accessible to a first target device of the at least one target device of the selected set of target devices, for playing on the portable communication device.

6. The method of claim 1, wherein controlling the playing of the selected content between the portable communication device and the at least one target device of the selected set of target devices comprises the portable communication device causing selected audio accessible to the portable communication device to play on an external speaker of the at least one target device of the selected set of target devices.

7. The method of claim 1, wherein controlling the playing of the selected content between the portable communication device and the at least one target device of the selected set of target devices comprises the portable communication device directing a first target device of the at least one target device of the selected set of target devices to play the selected content, which is stored on the first target device and the portable communication device.

8. The method of claim 1, wherein controlling the playing of the selected content between the portable communication device and the at least one target device of the selected set of target devices comprises the portable communication device broadcasting the selected content to multiple target devices of the at least one target device of the selected set of target devices.

9. The method of claim 1 further comprising triggering a start of a control session for controlling the sharing of the selected content between the portable communication device and the at least one target device of the selected set of target devices.

10. The method of claim 9, wherein the triggering is performed using a set of non-tactile user commands, a set of tactile user commands, or both.

11. The method of claim 9 further comprising ending the control session upon receiving a trigger comprising one or more of: detecting that the selected content is playing on the portable communication device; detecting a command to a first target device to play the selected content; detecting an elapse of a first amount of time without receiving an additional non-tactile user command; or detecting an explicit command to end the control session.

12. The method of claim 1, wherein the portable communication device is located within a first location area, and wherein determining the list of at least one target device comprises accessing a stored list identifying one or more target devices within the first location area.

13. The method of claim 1, wherein determining the list of at least one target device comprises:
receiving, from a proximal device, a transmission indicating presence of the proximal device;
generating the list using the received transmission.

14. The method of claim 1, wherein the voice and spatial gesture commands result from a dialog exchange between the portable communication device and a user of the portable communication device.

15. A portable communication device comprising:
an input component and a voice processing module coupled together to receive an utterance and to detect a voice command from the utterance;
a sensor hub to detect a spatial gesture command;
a processor coupled to the voice processing module and the sensor hub, the processor to:
determine a list of at least one target device in proximity to the portable communication device;
create a spatial map of relative location and orientation between the portable communication device and each target device on the list;
determine, by the portable communication device, a target vector for each target device in the list based on the spatial map, wherein each target vector corresponds to the relative location and orientation between the portable device and each target device;
determine, from the voice command, selected content and a selected set of target devices;
determine that the voice command is unable to identify one or more of the selected set of target devices, and responsively cause the portable communication device to monitor for the spatial gesture within a threshold period of time after receiving the voice command;
receive the spatial gesture command within the threshold period of time after receiving the voice command;
determine, from the spatial gesture command, a location vector;
determine at least one target device of the selected set of target devices on the list based on a comparison of the location vector to each determined target vector; and
control sharing of the selected content between the portable communication device and the at least one target device of the selected set of target devices, wherein controlling the sharing of the selected content comprises controlling the playing of the selected content between the portable communication device and the at least one target device of the selected set of target devices.

* * * * *